Patented Apr. 29, 1930

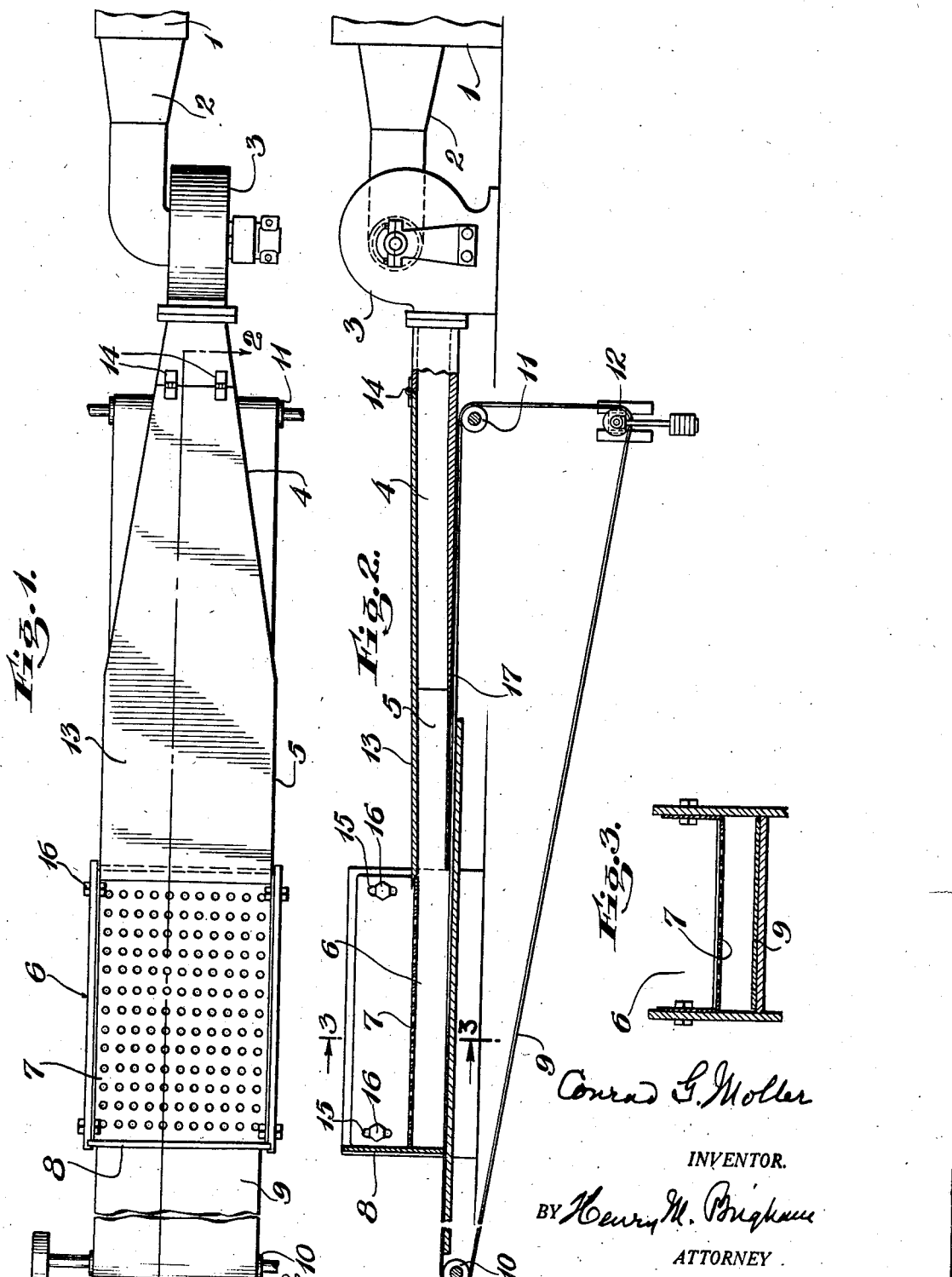

1,756,468

UNITED STATES PATENT OFFICE

CONRAD G. MOLLER, OF NEW CANAAN, CONNECTICUT, ASSIGNOR TO AMERICAN HAIR & FELT COMPANY, OF CHICAGO, ILLINOIS, A CORPORATION OF DELAWARE

PNEUMATIC APPARATUS FOR PRODUCING MATS OR BATS OF FIBROUS MATERIALS

Application filed March 29, 1929. Serial No. 351,083.

The object of my invention is to provide an apparatus for producing mats or bats of fibrous material by causing a fibre laden blast of air to convey to and pack the fibre in a moulding chamber, the walls of which are constructed to produce a mat or bat of any desired size, shape or contour in cross-section. The conduit from the blower to the moulding chamber is of such stream line conformation that no disturbing eddies will be generated in the fibre laden air between the blower and the moulding chamber.

I am familiar with the apparatus described in the De Long Patents No. 735,217 and No. 735,218, both dated August 4th, 1903. Both of these patents are owned by the Keystone Hair Insulator Company, of which I am a director. The apparatus was constructed substantially as shown in both of these patents but the bats produced were not of uniform density due to the fact that the angle of the throat between the blower and moulding chamber expanded laterally at a greater angle than the blast of fibre laden air could expand, which caused disturbing eddies which caused an uneven distribution of fibre to the moulding chamber. Adjustable dampers 4ª, 4ᵇ and 4ᶜ and longitudinal partitions 12 were provided in an effort to correct the distribution of the fibre but only served to create other disturbing eddies. I found that by limiting the flare of the throat of the conduit to approximately a nine degree angle on each side thereof and removing all angular pockets from the conduit and thus constructing such throat, conduit and moulding chamber with a stream line conformation that the fibre is evenly distributed to the moulding chamber and formed into a bat which is of substantially uniform density.

The other objects of my invention more fully appear in the following specifications and claims:

In the accompanying drawings Figure 1 is a plan view of my apparatus. Figure 2 is a sectional elevation on the line 2—2 of Figure 1. Figure 3 is a sectional view on the line 3—3 of Figure 1. Hair or other fibre is taken from a suitable picker 1 or other source of supply through a feed pipe 2 by a blower 3 and delivered by a throat 4, the angle of expansion on each side thereof being approximately nine degrees, and delivered by a conduit 5 to the moulding chamber 6. The throat 4 and conduit 5 and moulding chamber 6 are so constructed as to have a stream line conformation which prevents the generation of disturbing eddies. The upper wall 7 of the moulding chamber is perforated to permit the escape of air and retain the fibre in the moulding chamber. An obstruction plate 8 prevents the escape of the fibre until a sufficient bat has been formed in the moulding chamber to be maintained by frictional contact with the walls of the chamber when the plate is removed. An endless belt 9 mounted on rollers 10, 11 form the bottom wall of the moulding chamber. Means not shown are provided for operating the roll 11 so as to cause the belt 9 to carry the bat as it is formed from the moulding chamber 6. A weighted roll 12 keeps the belt taut. The lower wall of the conduit 5 is gradually reduced in thickness so that there will be substantially no angular pocket at its extreme end. As it is desirable to form bats of variant thickness, the upper wall 13 of the conduit is hinged at 14. Its outer end rests on the perforated wall 7 of the moulding chamber which is adjustable by means of the slots 15 and bolts 16. The end of 13 is cut away as shown so that no angular shoulder at the point of junction between the walls 7 and 8 will be formed.

Having described my invention I claim:

1. Pneumatic apparatus for producing mats or bats of fibrous materials comprising a moulding chamber having a perforated wall, means for producing a fibre laden air current and a flared conduit having a stream line conformation for conveying the fibre laden air current into said moulding chamber.

2. Pneumatic apparatus for producing mats or bats of fibrous materials comprising a moulding chamber having a perforated wall, means for producing a fibre laden air current, a conduit having a stream line conformation for conveying the fibre laden air current into said moulding chamber and the flare of the walls of said conduit being limited to approximately a nine degree angle.

3. Pneumatic apparatus for producing mats or bats of fibrous materials comprising a moulding chamber having a perforated wall, means for producing a fibre laden air current, a conduit having a stream line conformation for conveying the fibre laden air current into said moulding chamber and means for regulating the cross-sectional area of the moulding chamber and maintaining the stream line conformation of said conduit and moulding chamber.

March 25th, 1929.
CONRAD G. MOLLER.